United States Patent Office 3,470,169
Patented Sept. 30, 1969

3,470,169
PROCESS FOR PREPARING PHENOTHIAZINE
Gerhard F. Ottmann, Hamden, and David F. Gavin, New Haven, Conn., assignors to Olin Mathieson Chemical Corporation, a corporation of Virginia
No Drawing. Filed Sept. 1, 1967, Ser. No. 664,927
Int. Cl. C07d 93/14
U.S. Cl. 260—243    4 Claims

ABSTRACT OF THE DISCLOSURE

A process for preparing phenothiazine and substituted phenothiazines which comprises reacting nitrocyclohexane or alkyl substituted nitrocyclohexane with carbon disulfide in the presence of selected bases.

---

This invention relates to a novel process for the preparation of phenothiazine and alkyl substituted phenothiazines.

The compounds prepared in accordance with the process of this invention are known materials having a wide variety of useful applications. For example, phenothiazine is generally employed to combat internal parasites that attack cattle and sheep. Furthermore, it is a well-known antioxidant and is also extensively employed as an intermediate in the manufacture of dyes. The alkyl substituted phenothiazines similarly have found beneficial applications in industry. Thus, these phenothiazines are valuable antioxidants for many synthetic resins such as polypropylene, polyethylene, etc.

The aforementioned phenothiazines have been previously prepared by a variety of synthetic methods. For example, A. Bernthsen in Liebig's Ann. Chem., 77, 230 (1885) discloses the reaction of diphenylamine with sulfur in the presence of an oxidizing catalyst to provide phenothiazine. The alkyl substituted phenothiazines are similarly prepared by employing an alkylated diphenylamine as the reactant in the previously described process. While providing the desired phenothiazines, this process is commercially unattractive in view of the uneconomical synthesis necessary to prepare the diphenylamine reactant. Thus, aniline is reacted with aniline hydrochloride to provide generally unattractive yields of diphenylamine. Where an alkyl substituted phenothiazine is desired, the appropriate alkyl benzene must be nitrated and subsequently hydrogenated in a costly step to provide an alkyl substituted aniline. The hydrochloride is obtained by reacting the alkyl substituted aniline with hydrochloric acid. Then the desired diphenylamine is prepared by reacting an alkyl substituted aniline with an alkyl substituted aniline hydrochloride or aniline hydrochloride or, alternately, by reacting aniline with an alkyl substituted aniline hydrochloride.

Now it has been found that phenothiazine and selected substituted phenothiazines can be readily provided by the reaction of nitrocyclohexane or various alkyl substituted nitrocyclohexanes with carbon disulfide or carbon oxysulfide in the presence of selected bases. The reaction proceeds readily in a closed reaction system at a temperature range from about 160° to 220° C. under autogenous pressure to provide the desired phenothiazine in excellent purity. The process of this invention is a convenient, one-step procedure employing readily available or easily synthesized reactants.

The substituted nitrocyclohexanes suitable for use in the process of this invention include mono- and di-alkyl substituted nitrocyclohexanes having at least one and preferably two unsubstituted positions which are ortho with respect to the nitro group. Particularly preferred are the m- and p-lower alkyl, i.e., alkyl having 1 to 4 carbon atoms, nitrocyclcohexanes. Illustrative of these materials are 1-methyl-3-nitrocyclohexane, 1-methyl-4-nitrocyclohexane, 1,2-dimethyl-4-nitrocyclohexane, 1-ethyl-3-nitrocyclohexane, 1-propyl-4-nitrocyclohexane, 1-tert-butyl-3-nitrocyclohexane, 1-n-butyl-3-nitrocyclohexane, 1-isobutyl-3-nitrocyclohexane, etc. These substituted nitrocyclohexanes can be readily provided by the reaction of the corresponding alkylcyclohexane with potassium nitrate or aluminum nitrate according to the process described by Nametkin, Chem. Zent., II, 1377 (1910).

Among the bases which may be suitably employed in this process are certain metal alkoxides, aryloxides and mercaptides. For instance, included in such bases are those having the formula $$Me(XR)_n \qquad (I)$$

wherein Me represents either an alkali metal or a metal selected from Groups II and IIIb of the Periodic Table; X represents either oxygen or sulfur; $n$ is an integer from 1–3; and R represents alkyl or aryl moieties which may or may not have other substituents thereon. Thus, the terms "alkoxides," "aryloxides," and "mercaptides" as used herein represent compounds of this type where the alkyl and aryl substituents therein can bear substituents such as halogen, alkyl, aryl, alkoxy, aryloxy, thioalkyl, and the like, since these additional groups do not detract in general from the efficacy of the base in the formation of the desired phenothiazines.

While any of the above-mentioned metal alkoxides, aryloxides, and mercaptides may be advantageously employed in the practice of this invention, preferred bases comprise the alkali metal alkoxides, alkaline earth metal alkoxides and alkali metal phenoxides. Particularly preferred alkoxides included in the Formula I are those wherein R represents alkyl having 1 to 8 carbon atoms as well as substituted alkyl having 1 to 8 carbon atoms. Illustrative of such preferred bases are sodium methoxide, potassium ethoxide, lithium isopropoxide, sodium t-butoxide, sodium phenoxide and potassium phenoxide.

The preferred process embodiments of this invention utilize carbon disulfide in the reaction with the nitrocyclohexane reactant, although carbon oxysulfide can be suitably employed.

While the quantities of reactants employed in the process of this invention is not critical, it has been found that optimum yields are provided by employing a molar excess of carbon disulfide or carbon oxysulfide. Thus, preferred embodiments employ approximately two moles of carbon disulfide per mole of the nitrocyclohexane reactant. The amount of base employed in the reaction is similarly not a critical feature of this invention. However, preferably about one mole of base is employed per two moles of the nitrocyclohexane reactant.

Since the process is performed at an elevated temperature range of about 160° to 220° C., the reaction should be carried out in a closed reaction vessel. The reaction requires no additional pressure, since it proceeds easily under autogenous pressure; but, if desired, the reaction may be run at increased pressure, e.g., by charging inert gases such as nitrogen. It has been found that a preferred temperature range of about 180° to 200° C. is used for best results.

While solvents are not necessary in the practice of this invention, they can be advantageously used. For instance, excess carbon disulfide or excess nitro compounds may be used as solvents if so desired. Other solvents which are chemically inert to the components of the reaction system may also be conveniently employed. Among such suitable solvents are aliphatic and aromatic hydrocarbons such as benzene and toluene, halogenated aliphatic and aromatic hydrocarbons such as carbon tetrachloride, monochloronaphthalene, monochlorobenzene, dichlorobenzene, and the like. The proportion of solvents which may be conveniently employed is not critical, although it is preferable to limit the total volume to avoid the necessity of using excessively large equipment. A co-solvent may also be suitably employed in the process of this invention. Thus, any co-solvent which increases the polarity of the solvent system such as nitriles, tertiary amides, sulfones and sulfoxides can be employed.

The required sealed reaction vessel may be an autoclave or any other type of pressure reactor, and preferably such vessel should be equipped with stirring or rocking means. Workup of the reaction product provided by the process of this invention is uncomplicated. Thus, upon completion of the desired reaction at the above-mentioned elevated temperature range, the reaction vessel is generally cooled to ambient temperature prior to venting and removal of the crude reaction product. Filtration or other suitable solid-liquid separation techniques may be employed to remove solids or residues from the reaction product, and conventional techniques such as distillation, recrystallization, extraction and the like are preferably employed to isolate the desired phenothiazines from the product. All of the above-illustrated separation techniques may be carried out continuously.

The following examples will serve to illustrate the practice of this invention.

EXAMPLE 1

A 300 ml. rocking autoclave was charged with 25.0 g. of nitrocyclohexane, 25.0 g. of carbon disulfide, 6.0 g. of sodium methoxide, 5.0 g. of benzonitrile and 62 ml. of monochlorobenzene. This mixture was heated with rocking for two hours at 192° C. After cooling, the reaction mixture was filtered, the low boiling materials were evaporated from the filtrate and the residue was extracted with heptane to provide a solid product, which upon recrystallization from heptane gave 4 g. of phenothiazine, M.P. 181° C. Infrared analysis revealed characteristic phenothiazine absorption bands at 3.0, 13.35, 13.58 and 13.95 microns, thereby confirming the identification of the product.

EXAMPLE 2

A 100 ml. rocking autoclave was charged with 20.0 g. nitrocyclohexane, 20.0 g. of carbon disulfide and 4.8 g. of sodium methoxide. The mixture was heated with rocking at 190° to 195° C. for about two hours. After cooling, the reaction mixture was filtered and low-boiling liquids were evaporated from the filtrate to provide 10.1 g. of a liquid reaction mixture. Following the procedure of Example 1, phenothiazine, M.P. 181° C., was isolated from this reaction mixture. Vapor phase chromatography and infrared analysis confirmed that phenothiazine had been obtained.

What is claimed is:
1. A process for preparing phenothiazine which comprises
   (a) reacting nitrocyclohexane with
   (b) carbon disulfide in a closed reaction system at a temperature between about 160° and 220° C. in the presence of
   (c) a base selected from the group consisting of alkali metal alkoxide, alkaline earth metal alkoxide and alkali metal phenoxide.
2. The process of claim 1 wherein a temperature between about 180° and 200° C. is employed.
3. The process of claim 1 wherein an alkali metal alkoxide is employed as the base.
4. The process of claim 3 wherein sodium methoxide is employed as the alkali metal alkoxide.

References Cited
UNITED STATES PATENTS 3,107,242   10/1963   Craig _____ 260—243

HENRY R. JILES, Primary Examiner

HARRY I. MOATZ, Assistant Examiner